Figures 1, 2:
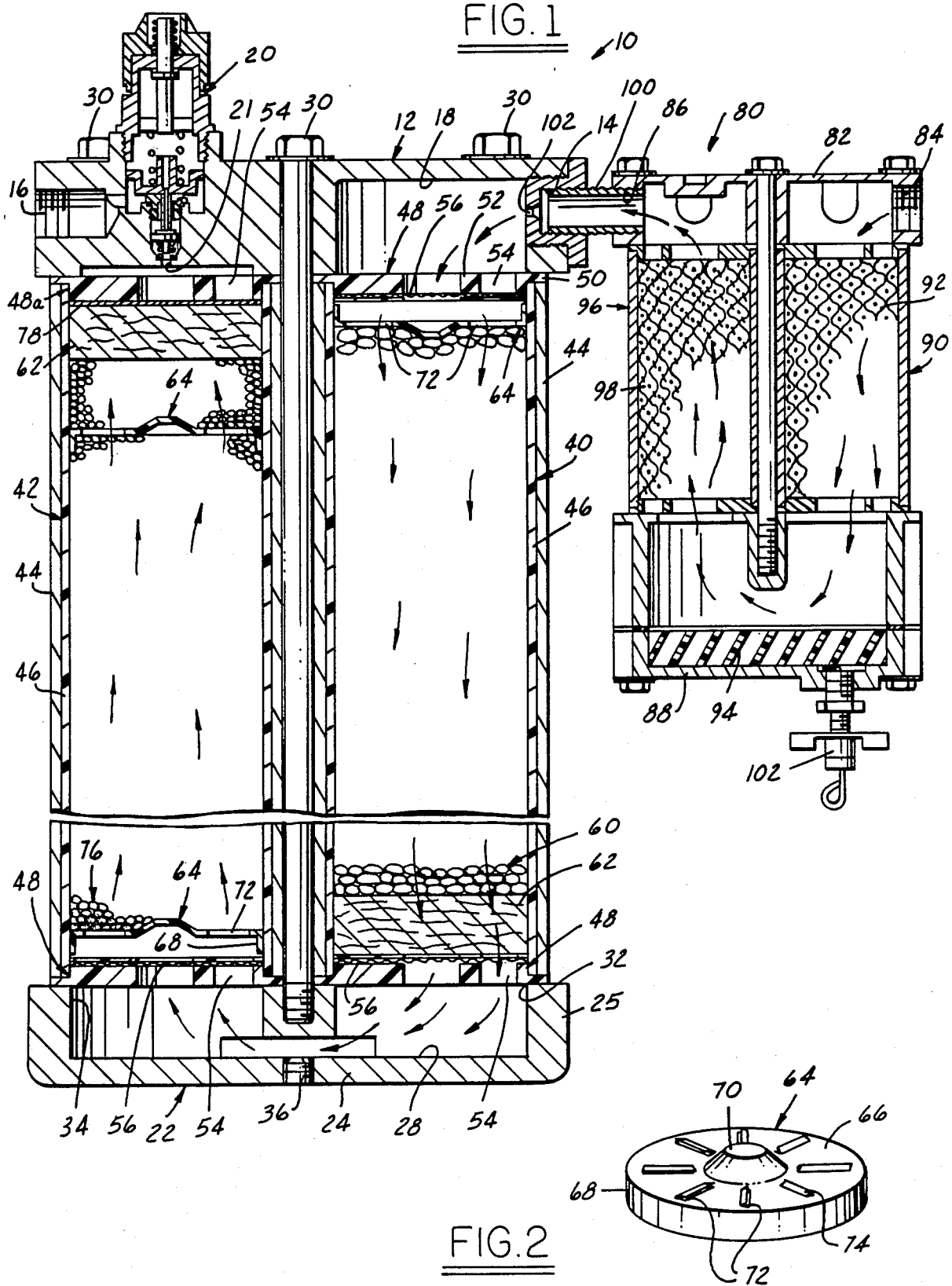

United States Patent [19]

Martin et al.

[11] Patent Number: 4,865,815

[45] Date of Patent: Sep. 12, 1989

[54] IN-LINE COMPRESSED AIR CARBON MONOXIDE FILTER

[75] Inventors: Charles E. Martin, Hicksville, Ohio; Kenneth W. Overby, Hamilton, Ind.

[73] Assignee: La-Man Corporation, Hamilton, Ind.

[21] Appl. No.: 56,123

[22] Filed: Jun. 1, 1987

[51] Int. Cl.⁴ ............................................. A62B 7/10
[52] U.S. Cl. ..................................... 422/122; 55/316; 55/318; 55/323; 55/327; 422/120; 422/171; 422/176; 422/195
[58] Field of Search ............... 422/176, 120, 122, 170, 422/171, 195, 311; 55/482, 318, 320, 322, 323, 316, 327

[56] References Cited

U.S. PATENT DOCUMENTS

| | | | |
|---|---|---|---|
| 3,252,270 | 5/1966 | Pall et al. | |
| 3,419,253 | 12/1968 | Eckert | 422/311 |
| 3,480,407 | 11/1969 | Wentworth | 422/195 |
| 3,818,667 | 7/1974 | Wagner | 422/311 |
| 3,852,042 | 12/1974 | Wagner | 422/176 |
| 3,865,553 | 2/1975 | Masat et al. | 422/195 |
| 3,910,770 | 10/1975 | Kobylinski et al. | 422/176 |
| 3,964,875 | 6/1976 | Chang et al. | 422/176 |
| 4,002,433 | 1/1977 | Oser | 422/176 |
| 4,182,120 | 1/1980 | Niebylski | 422/176 |
| 4,236,902 | 12/1980 | Fricke | 422/122 |
| 4,278,453 | 7/1981 | Klein | 55/316 |
| 4,448,757 | 5/1984 | Barnwell et al. | 422/122 |
| 4,487,618 | 12/1984 | Mann | 55/323 |
| 4,518,750 | 5/1985 | Govoni et al. | 422/311 |
| 4,521,378 | 7/1985 | Ichimura et al. | 422/311 |
| 4,537,748 | 8/1988 | Billiet | 422/122 |
| 4,600,416 | 7/1986 | Mann | 55/323 |
| 4,669,890 | 7/1987 | Peyrot | 422/195 |
| 4,746,338 | 5/1988 | Williams | 55/316 |

FOREIGN PATENT DOCUMENTS 2316278  10/1974  Fed. Rep. of Germany ...... 422/122

Primary Examiner—Barry S. Richman
Assistant Examiner—Timothy M. McMahon
Attorney, Agent, or Firm—Barnes & Thornburg

[57] ABSTRACT

An in-line air purifier for removing water, oil and carbon monoxide from a compressed air stream comprises a two-stage assembly in which the first stage includes replaceable cartridges for promoting coalescence of water and oil into droplets and removing such droplets from the air stream. The dried air is then routed to a second stage where it is passed through a replaceable cartridge containing a bed of activated charcoal for removal of odor-causing matter, and then through a further replaceable cartridge containing a bed of catalytic pellets which function at room temperature to remove carbon monoxide. The resulting purified air is routed through a manually adjustable pressure regulator to a purifier outlet.

11 Claims, 1 Drawing Sheet

IN-LINE COMPRESSED AIR CARBON MONOXIDE FILTER

The present invention is directed to air purifiers, and more particularly to filters for removing oil, water and carbon monoxide from compressed air lines for respirators and like applications Persons in an industrial environment using painting or sandblasting equipment, for example, are required by OSHA regulations to wear protective masks fed by compressed air. There is a problem surrounding oil, water and dust in the compressed air fed to the mask. Moreover, aged or worn air compressors tend to burn lubricating oil and generate carbon monoxide which may be fed, together with unpleasant odors, through the compressed air line toward the mask. OSHA sets allowable standards for contaminants. Prior art attempts to provide the required air purifying apparatus have generally been bulky, expensive, and/or of complex design, making adjustment and replacement of spent components relatively difficult and time consuming.

Copending U.S. application Ser. No. 733,114, filed May 13, 1985 and now abandoned and assigned to the assignee hereof, discloses an in-line air purifier for removing water, oil and carbon monoxide from a compressed air line which comprises a three-stage assembly mounted on a common air-routing manifold. The first stage includes replaceable cartridges for promoting coalescence of oil and water into droplets for removing such droplets from the air stream. The dried air stream is then routed to a second stage where it is passed through a porous electrically operated heater element. In the third stage, a bed of catalytic pellets is contained within a replaceable cartridge and receives air heated from the second stage for removal of carbon monoxide. A further replaceable cartridge containing a bed of activated charcoal receives the air stream from the catalytic bed for removing odor-causing matter, and the resulting purified air stream is routed through a final drying stage and a manually adjustable pressure regulator to a manifold outlet.

The air purifier so disclosed in the copending application represents a distinct improvement over the previous art in terms of size, adjustability and ready replacement of the various filter and purifier components. However, improvements remain desirable. In particular, necessity of heating the compressed air to enable reaction with the catalytic material is undesirable. Furthermore, consequent provision of a separate heating stage, including the heating element per se, undesirably adds to the bulk and expense of the purifier assembly.

A general object of the present invention is to provide air purifying apparatus of the described character which is more economical to fabricate and assemble than are similar devices in the prior art, which may be readily adjusted by an operator or user, which efficiently removes water, oil and carbon monoxide from a compressed air stream, and in which the various absorption components are provided in the form of disposable cartridges which may be readily and economically replaced by an operator without substantial downtime and without disassembly of the entire apparatus. A further and more specific object of the invention is to provide air purifying apparatus which obtains the foregoing objectives and in which necessity of heating the compressed air, and consequent provision of an air heating stage, have been eliminated.

The invention, together with additional objects, features and advantages thereof, will be best understood from the following description, the appended claims and the accompanying drawings in which:

FIG. 1 is an elevational bi-sectional view taken in a vertical plane through a presently preferred embodiment of air purifying apparatus in accordance with the invention; and FIG. 2 is a perspective view of an air baffle employed in the purifying apparatus of FIG. 1.

FIG. 1 illustrates a presently preferred embodiment 10 of an air purifier in accordance with the invention as comprising a manifold 12 having oppositely directed and coaxially aligned internally threaded openings 14,16 respectively defining an inlet and outlet adapted for in-line connection to a compressed air line. A concave internal surface 18 on manifold 12 internally opposed to inlet opening 14 directs inlet air orthogonally of the inlet axis, or downwardly in the orientation of FIG. 1. A pressure regulator 20 is mounted on manifold 12 and couples a downwardly opening port 21 to outlet 16 for directing upwardly flowing air to the outlet opening. Pressure regulator 20 may be of any suitable construction for permitting a user or operator manually to adjust pressure of compressed air supplied at outlet 16. A hollow base 22 of generally rectangular construction comprises a bottom wall 24 having a peripherally continuous upstanding sidewall 25. Base 22 thus forms a volume 28 suspended beneath and fastened to manifold 12 by the bolts 30. A pair of laterally spaced circular openings 32,34 are formed in base 22 in respective alignment in assembly with the inlet and outlet of manifold 12. A drainage plug 36 is removably received in base bottom wall 24.

A pair of spaced parallel cartridge assemblies 40,42 respectively couple inlet 14 to base 22 and base 22 to outlet 16. Cartridge assembly 40 comprises a cylindrical case 46 of imperforate plastic construction. A circular gasket 48 includes a peripheral flange 50 sealingly captured between the upper edge of case 46 in the opposing surface of manifold 12. The central body 52 of gasket 48 includes a plurality of apertures 54 for passing air therethrough. Gasket 48 is preferably of molded plastic composition and has a screen 56 molded therein covering passages 54 for preventing passage of particulate matter therethrough. A gasket 48 of identical construction is positioned at the lower end of cartridge 40 between the edge of case 46 and the opposing surface of base 22. Cartridge case 46 is telescopically received within and surrounded by a cylindrical pressure containment shell 44 of metallic construction.

Internally of cartridge case 46, a bed 60 of activated charcoal fills the internal cartridge volume and extends substantially between the cartridge end walls formed by gaskets 48. Activated charcoal bed 60, which preferably contains charcoal particles in the size range of 10×25 mesh functions to remove odor-causing matter from the air stream passing downwardly therethrough. A cylindrical block 62 of felt or other suitable filter material is positioned at the lower end of charcoal bed 60 adjacent to gasket 48 for preventing passage of charcoal dust and other particulate matter into the enclosed volume 28 of base 22. Filter block 62 preferably comprises a felt pad 0.80 inches thick and having a weight of 64 oz./yd$^2$.

At the opposing or upper end of bed 60, between the bed and upper gasket 48, there is positioned within cartridge case 46 an air baffle 64 which is shown in greater detail in FIG. 2. Baffle 64, which is preferably of integral molded plastic construction, comprises a flat circular disc 66 having a peripherally continuous skirt integrally axially projecting therefrom of diameter for sealing engagement with the inside surface of cartridge case 46. A central dimple or crown 70 projects axially of disc 66 in a direction opposite that of skirt 68. A plurality of radially extending rectangular slots or openings 72 extend through disc 66 and are positioned in an angularly spaced circumferential array around the central axis of disc 66. A vane 74 integrally projects from the surface of disc 66 adjacent to one long edge of each opening 72 and is angulated with respect to the disc surface so as to direct air passing through the adjacent disc opening circumferentially of the disc axis. Thus, openings 72 and vanes 74 function collectively to impart a circumferentially swirling motion to air passing therethrough. Furthermore, the baffle insures that air passing therethrough will be uniformly spread over the volume occupied by charcoal bed 60, rather than centrally or otherwise channeled through a limited portion of the bed. Crown 70 prevents charcoal particles from occupying what would generally be a dead air space immediately adjacent to the disc center.

Cartridge 42 includes a cylindrical case 46 of imperforate plastic composition surrounded by a telescoping metallic pressure shell 44. A lower gasket 48 sealingly couples the cartridge case and shell to base 22. At the upper end of cartridge assembly 42, a gasket 48a, identical to gasket 48 hereinabove described in detail but without an integral screen 56, sealingly couples cartridge 42 to manifold 12 coaxially with outlet port 21 and pressure regulator 20. Within cartridge 42, a bed 76 of catalytic particles or pellets fills the internal volume within case 46 and extends substantially between the cartridge end walls formed by gaskets 48,48a. Individual pellets of catalytic bed 76 are preferably of alumina impregnated with heavy metals (proprietary mixture) composition and have a particle size in the range of $\frac{1}{8}$" diameter. In a working embodiment of the invention, the catalytic material is purchased from Teledyne Corp. as Catalog Part No. LTC-95. This catalytic material has the distinct advantage of being functional at room temperature, and thus does not require preheating of air passing therethrough for removal of carbon monoxide. A block 62 of filter material is captured between the upper end of catalytic bed 76 and gasket 48a, and a disc 78 of paper or other suitable filter material is sandwiched between filter pad 62 and gasket 48a. Filter disc 78 is preferably of $1\mu$ filtering capability mesh. Thus, filter pad 62 and disc 78 cooperate in preventing passage of catalytic dust and other particulate material to the purifier outlet. A baffle 64 is positioned within cartridge 42 adjacent to base 22. Most preferably, at least one additional baffle 64 is captured within the catalytic bed itself to promote additional swirling action in air passing through the catalytic bed for enhanced reaction with the catalytic pellets and for additionally preventing channeling of air through a restricted portion of the catalytic bed.

Cartridges 40,42 are of readily replaceable construction. More specifically, cartridge 40 is preferably supplied with lower gasket 48 and baffle 64 ultrasonically welded or otherwise permanently secured to case 46, pad 62 and bed 60 being captured therebetween, and with upper gasket 48 separate. Likewise, cartridge 42 is supplied with upper gasket 48a and lower baffle 64 affixed to case 46, bed 76, intermediate baffle 64, pad 62 and paper disc 78 being captured therebetween, and with lower gasket 48 separate. In the field, when one or both cartridges 40,42 require replacement, bolts 30 are loosened with two (2) corner bolts removed and the corresponding cartridge and pressure shell are laterally removed. The used separate gasket is removed and discarded, and the used cartridge case subassembly is telescopically withdrawn from its pressure shell 44 and discarded. The new cartridge case subassembly is telescopically inserted, the new separate gasket placed in the opposing end, the assembly then reinserted between manifold 12 and base 22, and bolts 30 are replaced and tightened.

An air line vapor trap 80 for removing water and/or oil vapor from the compressed air stream includes a manifold 82 having spaced coaxial inlet and outlet openings 84,86, and a hollow base 88 suspended beneath manifold 82. A first cartridge assembly 90 extends between the manifold inlet and the enclosed volume within base 88, and contains a wire pad 92 adapted to promote coalescence of water and/or oil vapors in air passing therethrough into droplets which are then entrained by the air and carried into the base volume. An integral honeycomb structure 94 cooperates with the bottom wall and sidewalls of base 88 to form a dead air space which captures water and oil droplets falling from air entering the enclosed volume from cartridge 90. Since the construction of honeycomb structure 94 prevents substantial air movement therewithin, revaporization is substantially eliminated. In the meantime, the compressed air stream, which is now 75% to 95% dry, is fed from the enclosed volume within base 88 into cartridge 96. As air passes upwardly through fiber/-mesh plug 98, any remaining water droplets are re-evaporated. A drain 102 within base 88 may be activated a desired to remove liquid from the lower portion of base 88. Traps per se is disclosed in U.S. Pat. No. 4,600,416.

The dry air output of vapor trap 80 is fed by a fitting 100 and an orifice 102 to inlet 14 of the air purifier stage. The dry air is directed downwardly by manifold 12 through baffle 64 and into charcoal bed 60 wherein unpleasant odor-causing matter is removed. Following additional filtration at pad 62, air enters volume 28 within base 25 and flows upwardly through catalytic bed 76 wherein any carbon monoxide is removed in accordance with well-known principles by conversion to carbon dioxide. Following passage through filter pad 62 and filter disc 78, air from which water and oil vapors, odor-causing materials and carbon monoxide have been thus removed is fed through port 21 to purifier outlet 16 at a pressure controlled by regulator 20.

The invention claimed is:
1. A catalyzed filter assembly comprising
   a filter housing formed to include a filter chamber, inlet means for admitting air into the filter chamber, and outlet means for discharging air from the filter chamber,
   a bed of catalytic members disposed in the filter chamber to treat air conducted therethrough,
   first swirl means disposed in the filter housing for swirling air introduced into the bed of catalytic members, and
   second swirl means for swirling air in the bed of catalytic members, the second swirl means being positioned in downstream, spaced-apart relation to the first swirl means.
2. The filter assembly of claim 1, wherein the filter housing further includes an elongated, open-ended, hollow cartridge configured to define the filter chamber therein, the first swirl means is attached to the cartridge and positioned to cover an open inlet end of the cartridge, and the second swirl means is attached to the cartridge in a location intermediate the open inlet and outlet ends of the cartridge and positioned to partition the filter chamber into an axially upper and lower region.

3. The filter assembly of claim 2, wherein the bed of catalytic members includes a first set of the catalytic members disposed in the axially lower region of the filter chamber intermediate the first and second swirl means and a second set of the catalytic members disposed in the axially upper region of the filter chamber intermediate the second swirl means and the open outlet end of the cartridge.

4. The filter assembly of claim 2, further comprising means disposed in the open outlet end of the cartridge for preventing passage of dust and particulate matter therethrough.

5. The filter assembly of claim 2, wherein at least one of the first and second swirl means include a plate positioned to intercept air conducted through the filter chamber, the plate is formed to include a plurality of radially outwardly extending, circumferentially spaced slots for conducting air through the plate, and a plurality of vanes connected to the plate and positioned to intercept air conducted through the slots and shaped to swirl said intercepted air relative to the bed of catalytic members.

6. The filter assembly of claim 5, wherein each plate includes a peripheral edge in sealing engagement with an interior side wall of the cartridge.

7. The filter assembly of claim 5, wherein each slot is defined by a continuous rim edge and each vane is integrally attached to the rim edge at one of the slots.

8. A filter assembly for removing carbon monoxide from a compressed air line, the filter assembly comprising housing means for handling air conducted through a compressed air line, the housing means being formed to include an interior region, inlet means for admitting air from the compressed air line into the interior region, and outlet means for discharging air from the interior region to a point of use, filter means disposed in the interior region of the housing means for removing carbon monoxide from air conducted through the housing means, the filter means including a bed of catalytic members exposed to air admitted into the housing means through the inlet means and functional at room temperature to oxidize carbon monoxide entrained in said air, a bed of activated charcoal disposed in the interior region of housing means intermediate the inlet means and the filter means to treat air admitted into the inlet means before the air reaches the filter means, wherein the housing means further includes means for supporting the beds of activated charcoal and catalytic members within the interior region to define an enclosed space in the interior region interconnecting the bed of activated charcoal and the bed of catalytic members, first swirl means disposed in the enclosed space for swirling air conducted through the first enclosed space toward the bed of catalytic material in a first direction, and second swirl means disposed in the bed of catalytic members in spaced-apart relation to the first swirl means for swirling air conducted through the bed of catalytic material in said first direction.

9. The filter assembly of claim 8, wherein at least one of the first and second swirl means includes a plate positioned to intercept air conducted through the filter means, the plate is formed to include a plurality of radially outwardly extending, circumferentially spaced slots for conducting air through the plate, and a plurality of vanes connected to the plate and positioned to intercept air conducted through the slots and shaped to swirl said intercepted air relative to the bed of catalytic members.

10. A filter assembly for removing carbon monoxide from a compressed air line, the filter assembly comprising a filter housing formed to include a filter chamber, inlet means for admitting air from a compressed air line into the filter chamber, and outlet means for discharging air from the filter chamber to a point of use, and filter means for removing carbon monoxide from air circulated through the filter housing, the filter means including a bed of catalytic members disposed in the filter chamber to oxidize carbon monoxide entrained in the air conducted through the filter chamber, means encompassing the bed of catalytic members for maintaining the bed of catalytic members during circulation of air through the filter housing, wherein the maintaining means includes an enlongated hollow case having an imperforate side wall and open ends enclosing the bed of catalytic members and being disposed in the filter housing to receive only air introduced into the filter housing through the inlet means, further comprising first swirl means positioned at an inlet open end of the hollow case for swirling air introduced into the hollow case and second swirl means for swirling air in the hollow case, and wherein the second swirl means is positioned in the hollow case in spaced-apart relation to the first swirl means.

11. The filter assembly of claim 10, wherein at least one of the first and second swirl means includes a plate positioned to intercept air conducted through the filter means, the plate is formed to include a plurality of radially outwardly extending, circumferentially spaced slots for conducting air through the plate, and a plurality of vanes connected to the plate and positioned to intercept air conducted through the slots and shaped to swirl said intercepted air relative to the bed of catalytic members.

* * * * *